United States Patent [19]

Winnik et al.

[11] Patent Number: 4,644,041

[45] Date of Patent: Feb. 17, 1987

[54] PREPARATION OF POLY(METHYLMETHACRYLATE) POLYMER PARTICLES

[75] Inventors: Mitchell A. Winnik; Brett Williamson, both of Toronto, Canada

[73] Assignee: The University of Toronto Innovations Foundation, Toronto, Canada

[21] Appl. No.: 752,568

[22] Filed: Jul. 8, 1985

[51] Int. Cl.$^4$ ............................................. C08F 120/14
[52] U.S. Cl. ................................... 526/201; 428/402; 526/329.7
[58] Field of Search .................... 526/329.7, 201, 206, 526/207

[56] References Cited

U.S. PATENT DOCUMENTS

| | | | |
|---|---|---|---|
| 3,988,305 | 10/1976 | Stol et al. | 526/206 |
| 4,459,378 | 7/1984 | Ugelstad | 526/201 |
| 4,539,362 | 9/1985 | Davies et al. | 526/201 |

Primary Examiner—Harry Wong, Jr.
Attorney, Agent, or Firm—Finnegan, Henderson, Farabow, Garrett & Dunner

[57] ABSTRACT

Poly(methylmethacrylate) polymer particles of substantially increased average particle diameter are prepared by suspension polymerization in a medium comprising an alkane and a chlorinated hydrocarbon, e.g. carbon tetrachloride, in relative proportions chosen so as to provide buoyancy to the polymer particles so formed.

7 Claims, No Drawings

PREPARATION OF POLY(METHYLMETHACRYLATE) POLYMER PARTICLES

FIELD OF THE INVENTION

This invention relates to the production of poly(methylmethacrylate) particles and, more particularly, to a method of preparing such particles which results in increased particle size.

BACKGROUND OF THE INVENTION AND PRIOR ART

Poly(methylmethacrylate) particles, [PMMA], sterically stabilized, are typically prepared by suspension polymerization in a reaction medium such as an aliphatic hydrocarbon solvent, in which the monomer is soluble but in which the polymer is insoluble, and using free radical initiators such as benzoyl peroxide or azobisisobutyronitrile. The reaction medium also includes a steric stabilizer such as polyisobutylene or degraded butyl rubber. The reaction is allowed to proceed at elevated temperatures under an inert atmosphere. The process is capable of producing poly(methylmethacrylate) particles having diameters of the order of 0.3 um.

For some purposes, it would be desirable to be able to produce larger poly(methylmethacrylate) particles, or at least to produce batches of such particles including some particles of larger diameter. Presently available suspension polymerization processes, however, appear incapable of preparing such larger particles (see for example the chapter by D. J. Walbridge in the book entitled "Dispersion Polymerization in Organic Media", Barrett, K. E. J., ed., Wiley, New York, 1975 at p.87.

SUMMARY OF THE INVENTION

It is an object of the present invention to provide a process by which relatively large particles of sterically stabilized poly(methylmethacrylate) particles may be produced. It is a further object of the present invention to provide sterically stabilized poly(methylmethacrylate) particles having a diameter in excess of 0.3 $\mu$m.

In the process according to the present invention, the poly(methylmethacrylate) particles are prepared by polymerization of methylmethacrylate in the presence of a steric stabilizer in a reaction medium comprising an aliphatic hydrocarbon solvent in admixture with a liquid additive of greater density. Broadly characterized, the additive fulfills the following requirements: it is a good solvent for the monomer and a poor solvent for the resultant polymer; it is miscible with the hydrocarbon solvent over a wide range of proportions; its density is greater than that of the hydrocarbon solvent, with the result that a mixture thereof with the hydrocarbon solvent can be formed in which the resultant polymer particles have a degree of buoyancy.

It has been found that these requirements are met by organic compounds having a high halogen content which also are alkane compatible.

Thus, according to the present invention, there is provided a process for preparing poly(methylmethacrylate) particles which comprises polymerizing methylmethacrylate monomer by free radical polymerization in a reaction medium in which the monomer is soluble but in which the poly(methylmethacrylate) polymer particles are substantially insoluble, and in the presence of a steric stabilizer, said reaction medium comprising a mixture of an aliphatic hydrocarbon liquid and a halogenated hydrocarbon miscible therewith, the halogenated hydrocarbon having a density greater than that of the aliphatic hydrocarbon.

DESCRIPTION OF THE PREFERRED EMBODIMENTS

Suitable aliphatic hydrocarbon liquids include alkanes from C5-C20, preferably from C5-C10, either straight, cyclic, or branched chain such as trimethylpentane. Mixtures thereof, such as the commercially available "Isopar G", may also be used. Due regard should be given, when selecting the solvent, to the usual parameters known to those skilled in the art, such as boiling point, monomer solubility etc.

In common with prior art processes for suspension polymerization of methylmethacrylate, a steric stabilizer is included in small amounts in the reaction medium of the present invention. In general terms, a steric stabilizer is a polymeric material, usually a graft copolymer or a block copolymer, or one containing residual unsaturation. The major component of the copolymer is soluble in the reaction medium, whilst the minor component is insoluble therein, but is present in such small amounts that it does not render the entire copolymer insoluble in the medium. It is believed that the insoluble portion or the residual unsaturation provides an anchor point or grafting site from which the poly(methylmethacrylate) particles can grow as polymerization proceeds, so as to help maintain the suspension of the growing particles in the medium. Steric stabilizers are discussed and described in the aforementioned volume edited by K. E. J. Barrett, "Dispersion Polymerization in Organic Media," Wiley, New York, 1975. Examples of suitable steric stabilizers for use in the present invention include poly(isobutylene-co-isoprene), degraded butyl rubber, hydrogenated polybutadiene, block copolymeric siloxane-styrenes such as poly(dimethylsiloxane-styrene) etc., preference being given to the hydrocarbon polymers.

The preferred halogenated hydrocarbon for use in the present invention is carbon tetrachloride. It has been found that a mixture of carbon tetrachloride with a hydrocarbon solvent such as trimethylpentane results in a reaction medium having a density which can closely approximate the density of the resultant polymer. The carbon tetrachloride appears to act as a weak chain transfer agent during polymerization. However, its effect as particle size of the resulting polymer seems to be unrelated to its activity as a chain transfer agent. Another example of a preferred halogenated hydrocarbon is methyl chloroform, which behaves in essentially the same way. In any event, the process of the present invention provides poly(methylmethacrylate) particles of a mean diameter of at least 0.4 $\mu$m, normally at least 0.8 $\mu$m, up to 30 $\mu$m in diameter. Further control over the particle size and particle size disbribution can be obtained by varying the amount of stabilizer. For example, preparation of particles uniform in size with diameters of 8.0 $\mu$m to 13 $\mu$m in diameter can be produced in this way.

The reaction medium components may be used in various ratios with consideration given to the desired density, boiling point, etc. of the resultant medium. The ratio should be such as to attain a reaction medium density approximating or exceeding that of the finally formed poly(methylmethacrylate) particles. When trimethylpentane is used as the hydrocarbon and carbon tetrachloride as the halogenated hydrocarbon, ratios of about 4:1 to 1:4 are suitable, best results being obtainable when the two ingredients are mixed in a 1:1-1:2 ratio. Ratios employable when alternatives to the two ingredients are used should be calculated to allow the resultant density of the reaction medium to approximate i.e. ±20%, preferably ±10% of the density of the polymer produced in the process to maintain the buoyancy effect. In processes which are known, alkane solvents are typically employed which generally have densities less than 1g/ml whereas the density of poly(methylmethacrylate) particles is about 1.18 g/ml. The carbon tetrachloride preferably used has a density of about 1.58 g/ml (1.49 g/ml at 80°) and thus, when combined with the alkane solvent, the density can be made to approximate that of the produced polymer. The density of a 1:2 mixture of trimethylpentane and carbon tetrachloride is approximately 1.21 at 80°.

According the preferred mode of the process aspect of the present invention, the process entails a first step in which the desired steric stabilizer is introduced to a reaction medium containing an aliphatic hydrocarbon and a highly halogenated alkane in a 1:1-1:2 ratio mixture. The resulting solution is then purged with nitrogen gas to provide an inert atmosphere and the temperature is adjusted to provide optimum conditions for polymerization. A free radical polymerization initiator, preferably benzoyl peroxide, is then added to the solution which is stirred to approach homogeneity. A quantity of methyl methacrylate monomer is then added to the solution and the reaction is allowed to proceed to a preliminary stage in which the polymer attaches to the stabilizer. Additional amounts of initiator and methyl methacrylate monomer are added in a controlled fashion thereafter and in this way, progression of the reaction can be controlled. It is not necessary, however, that stabilization of the methyl methacrylate polymer be conducted in a separate distinct stage. The entire process can be conducted by addition of a controlled amount of methyl methacrylate monomer to the reaction medium containing the necessary ingredients.

Specific preferred embodiments of the present invention are illustrated in the following examples.

EXAMPLE I

A 3.5% solution of 10 g of poly(isobutylene-co-isoprene) was prepared in 96.5% of a 1:1 mixture of trimethylpentane and CCl$_4$. The solution was purged with N$_2$ and with the temperature adjusted to 75° C., 0.2 g of benzoyl peroxide was added and the solution stirred for 1 hour. After this period 1.0 g of methylmethacrylate was added and the system was stirred for 16 hours under a N$_2$ atmosphere. At the end of 16 hours, 0.3 g of benzoyl peroxide or azobisisobutyronitrile was added and 40 g of methyl methacrylate was added over an hour. The polymerization was continued for 16 hours with constant mechanical stirring under a N$_2$ atmosphere. The reaction mixture was cooled to room temperature and the particles cleaned by successive steps of centrifugation, decanting, and resuspension. The particles were freeze dried to a powder.

Scanning electron microscopy showed a maximum particle diameter of 3.0 μm.

EXAMPLE II

A 3.5% solution of 10 g of poly(isobutylene-co-isoprene) was prepared in 96.5% of a 1:1 mixture of trimethylpentane and CCl$_4$. The solution was purged with N$_2$, heated to 75° C., 0.3 g of benzoyl peroxide was added, followed by 40 g of methylmethacrylate, added over a period of 1 hour. The polymerization was carried out for 16 hours with constant mechanical stirring. After cooling to room temperature, the cleaning procedure used was identical to that of Example 1.

Scanning electron microscopy shows a maximum particle diamter of 3.0 μ.

The particles produced in Examples I and II have maximum diameters approximately ten times larger than those produced by prior art suspension polymerization processes.

Poly(methyl methacrylate) particles according to the present invention have been found to possess smoother surfaces according to scanning electron microscope photographs. Also, the greater size of the poly(methyl methacrylate) particles makes the particles available for use as toner in xerography and enhances their use in coating compositions such as paints.

EXAMPLE III

A 0.3% solution of 0.2 g of poly(isobutylene-co-isoprene) was prepared in 99.7% of a 1:2 mixture of 2,2,4-trimethylpentane and CCl$_4$. The solution was purged with N$_2$, heated to 75 C., 0.09 g of azobisisobutyronitrile was added, followed by 5 g of methylmethacrylate, added over a period of one half hour. The polymerization was carried out for 8 hours with constant mechanical stirring, under a N$_2$ atmosphere. After cooling the reaction mixture to room temperature, the cleaning procedure used was identical to that of Example 1.

Scanning electron microscopy shows a uniform particle diameter of 13.0 microns.

We claim:

1. A process for preparing poly(methylmethacrylate) particles, which comprises polymerizing methylmethacrylate monomer by free radical polymerization in a reaction medium in which the monomer is soluble but in which the poly(methylemthacrylate) polymer particles are substantially insoluble and in the presence of a steric stabilizer, said reaction medium comprising a mixture of a straight chain, branched chain or cyclic liquid alkane of 5-20 carbon atoms and an alkane compatible liquid helogenated hydrocarbon, the halogenated hydrocarbon having a density greater than that of the alkane, the ratio of alkane to halogenated hydrocarbon being such as to attain a reaction medium density approximating or exceeding that of the poly(methylmethacrylate) particles formed, said halogenated hydrocarbon being one which will dissolve methylmethacrylate monomer but will not significantly dissolve the resultant poly(methlmethacrylate) particles.

2. The process of claim 1 wherein the relative proportions of the alkane and the halogentated hydrocarbon are in the approximate range 4:1 to 1:4.

3. The process of claim 2 wherein the halogenated hydrocarbon is carbon tetrachloride or methyl chloroform.

4. The process of claim 3 wherein the alkane is a C$_5$–C$_{10}$ alkane or a mixture of two or more such alkanes.

5. The process of claim 4 wherein the alkane is trimethylpentane.

6. The process of claim 5 wherein the ratio of trimethylpentane:carbon tetrachloride or trimethylpentane:methyl chloroform is about 1:2.

7. The process of claim 3 wherein the steric stabilizer is selected from the group consisting of poly(isobutylene-co-isoprene), degreaded butyl rubber and hydrogenated polybutadiene.

* * * * *